United States Patent [19]

Furuno et al.

[11] Patent Number: 5,200,464
[45] Date of Patent: Apr. 6, 1993

[54] WATER-SOLUBLE RADICAL-CURING POLYVINYL ALCOHOL DERIVATIVE

[75] Inventors: Akihisa Furuno; Susumu Harashima, both of Kanagawa, Japan

[73] Assignee: Nitto Chemical Industry Co. Ltd., Tokyo, Japan

[21] Appl. No.: 631,846

[22] Filed: Dec. 21, 1990

[30] Foreign Application Priority Data

Dec. 22, 1989 [JP] Japan .................. 1-331169

[51] Int. Cl.$^5$ ............................... C08F 8/00
[52] U.S. Cl. ......................... 525/59; 525/60
[58] Field of Search ..................... 525/59, 60

[56] References Cited

U.S. PATENT DOCUMENTS

| | | | |
|---|---|---|---|
| 3,911,053 | 10/1975 | Wiest et al. | 525/59 |
| 4,102,946 | 7/1978 | Imura et al. | 525/59 |
| 4,124,748 | 11/1978 | Fujimoto et al. | 525/60 |
| 4,567,221 | 1/1986 | Maruyama et al. | 525/60 |
| 4,581,394 | 4/1986 | Yoshida et al. | 525/59 |
| 4,636,551 | 1/1987 | Okaya et al. | 525/60 |
| 4,885,105 | 12/1989 | Yang et al. | 525/60 |

FOREIGN PATENT DOCUMENTS

| | | |
|---|---|---|
| 49-4738 | 1/1974 | Japan . |
| 0096605 | 5/1985 | Japan ................. 525/59 |
| 0255811 | 12/1985 | Japan ................. 525/59 |
| 2051096 | 1/1981 | United Kingdom . |

Primary Examiner—Joseph L. Schofer
Assistant Examiner—J. M. Reddick
Attorney, Agent, or Firm—Sughrue, Mion, Zinn, Macpeak & Seas

[57] ABSTRACT

A radical-curing polyvinyl alcohol derivative is disclosed, which is obtained by reacting an anion-modified polyvinyl alcohol prepared by saponification of a copolymer comprising vinyl acetate and an unsaturated carboxylic acid and/or a derivative thereof with a glycidyl-containing vinyl compound in water or in a mixed solvent of water and a lower alcohol under acidic conditions, and which is useful as an image-forming material which is curable upon light irradiation and developable with water.

18 Claims, No Drawings

WATER-SOLUBLE RADICAL-CURING POLYVINYL ALCOHOL DERIVATIVE

FIELD OF THE INVENTION

This invention relates to a polyvinyl alcohol derivative curable on radical reaction. The compound is useful especially as an image-forming material which is curable on light irradiation and developable with water.

BACKGROUND OF THE INVENTION

Radical-curing water-soluble polymers can be used without any organic solvent and are therefore favorable from the standpoint of economy, safety, and environmental hygiene. They have hence been extending their use in a broad range of applications as binders, sizes for textile, immobilizing agents for enzymes, and the like. Inter alia, water-developable image-forming materials have acquired importance in the field of printing, information processing, and electronics as, for example, masks for screen printing, resin letterpresses, and etching resists.

Polyvinyl alcohol (hereinafter abbreviated as PVA) has hitherto been used widely as an image-forming material in the form of a photo-curing system, such as a PVA-bichromate system, a PVA-diazonium salt system, because it has excellent film-forming properties to provide a water-resistant cured film. However, since these PVA photo-curing systems are poor in preservation stability and, in particular, the former system causes a toxicity problem arising from a chromium ion, various attempts have been made to introduce a photosensitive group into PVA itself to provide a photosensitive image-forming PVA derivative.

Techniques for modifying PVA are roughly classified into methods of introducing a photo-dimerizable photosensitive group and methods of introducing a radical polymerizable double bond (vinyl group) as a side chain. The latter group of methods are advantageous in that the radical polymerization has no theoretical upper limit in photon yield. Therefore, high sensitivity can be obtained and physical properties of a cured film, based on the ultimate use, can be selected by combining various other monomers. As a result, many processes for the latter method have been proposed.

However, most of the processes proposed for the introduction of a double bond into PVA involve a reaction step in an organic solvent and are therefore not economical. For example, JP-A-49-4738 (the term "JP-A" as used herein means an "unexamined published Japanese patent application") discloses a process in which PVA is reacted with an acid anhydride in pyridine or dioxane to isolate a purified carboxyl-modified PVA, and the modified PVA is dissolved in a solvent, e.g., dimethylformamide, and reacted with a glycidyl-containing unsaturated compound to introduce a double bond. Further, JP-B-48-6962 (the term "JP-B" as used herein means an "examined published Japanese patent application") discloses a reaction between PVA and maleic anhydride in an organic solvent (dimethyl sulfoxide or dimethylacetamide is used in the working examples). According to this process, however, maleic anhydride should be introduced in a large proportion in view of its low polymerization activity, and the resulting modified PVA is no longer water-soluble.

Introduction of a double bond into PVA in water has been proposed in JP-A-54-138090 and JP-B-49-5923. The former process comprises reacting PVA with acrolein or crotonaldehyde to form an acetal. The double bond thus introduced has poor reactivity. On the other hand, the latter process comprises reacting PVA with N-methylolacrylamide in water. This process attains a low reaction rate in practice, and fails to obtain modified PVA having sufficient photosensitivity.

JP-A-58-11931 proposes a process for introducing a (meth)acryloyl group into PVA which comprises reacting a completely or partially saponified general PVA with a compound having an epoxy group and a (meth)acryloyl group. According to the process, general PVA possesses one carboxyl group, at the most, per high molecular weight polymer molecule due to chain transfer of an acetyl group formed during polymerization of vinyl acetate, and the carboxyl group is reacted with an epoxy group to introduce a (meth)acryloyl group and, at the same time, the hydroxyl group of PVA is also reacted with an epoxy group. However, since the reaction between the hydroxyl group and the epoxy group in an aqueous medium is slow and, also, the number of the terminal carboxyl group is one or less per high molecular chain, the amount of a vinyl group introduced is extremely small, and, therefore, fails to afford sufficient photosensitivity. For this reason, the process uses a separately prepared photopolymerizable monomer in combination.

SUMMARY OF THE INVENTION

An object of the present invention is to solve the problems associated with conventional processes and to provide a novel polyvinyl alcohol derivative in an economical manner.

The inventors have conducted extensive studies on a process for introducing an active vinyl group into PVA by using water and a relatively cheap lower alcohol as a reaction medium and, as a result, produced a novel PVA derivative having a radical curing double bond as a side chain.

The above and other objectives and advantages are obtained by the present invention which relates to a radical-curing PVA derivative which is obtained by reacting an anion-modified PVA prepared by saponification of a copolymer comprising vinyl acetate and an unsaturated carboxylic acid and/or a derivative thereof with a glycidyl-containing vinyl compound in water or in a mixed solvent of water and a lower alcohol under acidic conditions.

DETAILED DESCRIPTION OF THE INVENTION

The anion-modified PVA which can be used in the present invention can be prepared by copolymerizing vinyl acetate and an unsaturated carboxylic acid and/or a derivative thereof in a usual manner, for example, in methanol and saponifying the resulting copolymer with an alkali or an acid. Examples of suitable unsaturated carboxylic acids include acrylic acid, methacrylic acid, maleic acid, fumaric acid, and itaconic acid. Derivatives of the unsaturated carboxylic acid include those capable of forming a free carboxyl group or a salt thereof on saponification subsequent to copolymerization. Examples of such derivatives suitable for practical use are esters, anhydrides and salts of the above-mentioned unsaturated carboxylic acids. The proportion of the unsaturated carboxylic acid and/or a derivative thereof in the total monomers to be copolymerized suitably ranges from 0.5 to 10 mol%. If it is less than 0.5 mol%, the amount of a vinyl group introduced might be insufficient for obtaining sufficient radical-curing characteristics. If it exceeds 10 mol%, physical properties of the resulting modified PVA might change. It should be noted, however, that the copolymerization ratio is not limited to the above-recited range and is variable depending on the end use of the product. If desired, a small amount of a third vinyl monomer other than vinyl acetate and the unsaturated carboxylic acid (or a derivative thereof) may be copolymerized to make physical properties or performance properties of the final product the most suitable for the end use.

Saponification of the resulting copolymer can be performed in a known manner. Conditions can be decided so that a degree of saponification reached may be the most suitable for obtaining desired physical properties of the final product. However, if the degree of saponification of the anion-modified PVA is less than 60%, the final product could lose water-solubility. The terminology "degree of saponification" as used herein means a proportion of saponified vinyl acetate units in the copolymer. As is commonly accepted, PVA having a degree of saponification of from 75 to 90% shows the highest water solubility and can be dissolved in water in high concentrations with ease of handling. While the same can be applied to the present invention, the anion-modified PVA having a degree of saponification of substantially 100% is excellent from the viewpoint of water-resistance of a dried film. It is therefore necessary to select a proper degree of saponification according to the end use of the product. In selecting a suitable degree of saponification, the fact that hydrophilic properties of the product and physical properties of a dried film vary depending on the properties and the proportion of the unsaturated carboxylic acid unit in the copolymer should be taken into consideration.

The degree of polymerization of the anion-modified PVA can be controlled in a usual manner, for example, by selecting the amount of an initiator to be used for polymerization or the polymerization temperature or by using a chain transfer agent. In general, the degree of polymerization suitably ranges from about 500 to 3,800. The higher the degree of polymerization, the easier it is to produce a product having high radical-curing characteristics (sensitivity in photo-curing), but, on the other hand, the lower the degree of polymerization, the higher the water solubility. In terms of ease in handling, a more preferred degree of polymerization is in the range of from about 700 to 1000. The terminology "degree of polymerization" as used herein means a value obtained from a molecular weight reduced to a polyethylene oxide (hereinafter abbreviated as PEO) which is obtained by gel-permeation chromatography (hereinafter abbreviated as GPC) using a 0.1M phosphoric acid buffer as an eluent. This value is about 1.5 times the degree of polymerization obtained by general viscometry.

The glycidyl-containing vinyl compound which can be used in the present invention is a known compound, such as glycidyl acrylate and glycidyl methacrylate. These known compounds are preferably used in the present invention from the standpoint of reactivity of their vinyl group.

Since epoxy compounds including glycidyl-containing compounds have reactivity with water, reactions between an epoxy compound and a compound having active hydrogen, such as carboxylic acids, amines, and hydroxyl compounds, are generally conducted in an organic solvent, usually in the presence of a quaternary salt of an amine as a catalyst (see JP-A-49-4738 supra).

As a result of intensive investigations on the method for carrying out the reaction between an epoxy compound and a carboxylic acid, the inventors found, on the contrary, that the reaction can proceed in an aqueous medium under a limited condition, i.e., under acidic conditions. As a matter of course, the reaction in an aqueous medium is accompanied by a side reaction between a glycidyl group and water, but a vinyl group can be introduced to a substantial degree by reacting PVA having a carboxyl group with a glycidyl-containing vinyl compound in an aqueous medium.

The amount of the glycidyl-containing vinyl compound to be used is based on the content of the carboxyl group in the anion-modified PVA. Because of the above-mentioned side reaction with water, the glycidyl-containing vinyl compound is preferably used in excess, i.e., from 2 to 5 molar times, the carboxyl group.

The reaction between the anion modified PVA and the glycidyl-containing vinyl compound is conducted in water or in a mixed solvent of water and a lower alcohol. Preferred lower alcohols include industrially produced ones having from 1 to 4 carbon atoms, e.g., methanol and ethanol. The anion-modified PVA is first dissolved in the solvent in a concentration of from about 10 to 50% by weight. In the case of preparing a PVA solution at a high concentration, a mixed solvent is preferable to water alone so that the solution has a reduced viscosity. It is required to conduct the reaction between the anion-modified PVA and the glycidyl-containing vinyl compound under acidic conditions, and preferably at a pH ranging from 1 to 5. The pH adjustment is effected with any common acid, e.g., hydrochloric acid or sulfuric acid.

In order to accelerate the reaction, the reaction mixture is preferably heated with stirring. Since a reaction temperature which is too high is liable to cause unfavorable side reactions, a suitable temperature is in the range of from about 50° C. to 80° C. For the purpose of preventing radical reactions of a vinyl group, it is recommended to add a small amount of an inhibitor, such as hydroquinone monomethyl ether. It is preferable for assuring preservation stability of the product that the inhibitor be previously added to a solvent, e.g., methanol, which is used for reprecipitation and purification of the reaction product.

The resulting reaction mixture may be used as such as a final product or, depending on the end use, the reaction product may be poured into a solvent (different from the water/lower alcohol mixerl solvent mentioned above), e.g., methanol, ethanol, acetone, and methyl ethyl ketone, to collect a precipitate, which is then dried and purified.

The carboxyl group content in the anion-modified PVA can be determined by neutralization titration of its aqueous solution with an alkali (alkalimetry). Measuring the decrease of the carboxyl group content before and after the reaction reveals the amount of the double bond introduced by the reaction.

According to the present invention, a double bond having strong radical reactivity, such as an acryl group and methacryl group, can be economically introduced into PVA by using water or a cheap lower alcohol as a solvent.

The PVA derivative of the present invention can be reacted with a radical generator, such as a redox initiator, in an aqueous solution to form a gel which is useful for immobilization of enzymes. In a particularly effective application, the PVA derivative of the present invention is useful as an image-forming material which undergoes photo-curing. More specifically, an excellent image can be formed by coating a solution of the PVA derivative in water or a mixed solvent of water and an alcohol on a substrate, e.g., a metallic plate, and, after drying, irradiating the coating with light through a negative mask, followed by development with water (or an alkaline aqueous solution). In this case, an additive called a photo-initiator or a sensitizer, is usually added to the coating solution. The coating solution may further contain other components for various purposes, such as other vinyl monomers and water-soluble resins, similar to the preparation of general photosensitive resin compositions. It is also acceptable that not only water-soluble resins but aqueous dispersions of hydrophobic resins, e.g., a vinyl acetate emulsion, may be incorporated into the coating solution. The prepared photosensitive resin compositions containing the PVA derivative of the present invention are suited for use in various fields, including plate making in lithographic printing, letterpress printing, intaglio printing, and screen printing; fine processing in the production of printed circuit boards, TV shadow masks, etc.; and textile treatment.

The present invention is now illustrated in greater detail with reference to Preparation Examples and Examples, but it should be understood that the present invention is not deemed to be limited thereto. In the examples, all the percents, parts, and ratios are by weight unless otherwise specified.

PREPARATION EXAMPLE 1

Preparation of Anion-Modified PVA

Vinyl acetate and maleic anhydride were copolymerized in methanol, and the resulting copolymer was subjected to alkali saponification to obtain an anion-modified PVA.

In a 1 l-separable flask, 389.2 g of vinyl acetate and 10.8 g of maleic anhydride were dissolved in 100 g of methanol, and the solution was heated to 65° C. To the solution was added 5.6 ml of a 0.5% methanol solution of azobisisobutyronitrile, followed by stirring at that temperature for 5 hours. The temperature was further raised up to 85° C., and polymerization was continued for 2 hours at that temperature. Then, while adding methanol to the reaction mixture, the unreacted vinyl acetate was distilled off together with methanol.

After allowing to cool, the polymerization mixture was about 8 fold diluted with methanol, and 24.3 g of a 40% sodium hydroxide aqueous solution was added thereto. After allowing the mixture to stand at room temperature, a large quantity of a white saponification product was precipitated, which was then collected by filtration, re-dispersed in methanol, and heat-refluxed to wash away the by-product, sodium acetate. After cooling, the mixture was filtered, and the filter cake was dried to obtain 247 g of a white polymer.

The PEO-reduced degree of polymerization as measured by GPC was 2,300, and the degree of saponification as measured according to JIS-6726 was 99.1%. The content of carboxyl groups as measured by alkalimetry at a pH between 3.2 and 8.5 was 1.03 meq/g.

The PEO-reduced degree of polymerization obtained by GPC was about 1.5 times the degree of polymerization obtained by general viscometry as stated above. The degree of saponification was obtained by correcting the value measured according to a commonly employed method of JIS-6726 for the carboxyl group content in the polymer.

Measurements of physical properties of polymers obtained in examples hereinafter described were made in the same manner.

The anion-modified PVA which was obtained is hereinafter designated polymer A.

PREPARATION EXAMPLES 2 TO 7

Preparation of Anion-Modified Polymer

Polymers B to G were prepared in the same manner as in Preparation Example 1, except for varying the degree of anion modification by changing the amount of maleic anhydride to be charged; varying the degree of polymerization by changing the monomer concentration and the amount of the initiator; and varying the degree of saponification by changing the amount of the alkali as a saponifier.

Physical properties of polymers A to G are shown in Table 1 below.

TABLE 1

| Polymer No. | Degree of Polymerization | Degree of Saponification (%) | Carboxyl Group Content (meq/g) |
|---|---|---|---|
| A | 2300 | 99.1 | 1.03 |
| B | 2100 | 98.5 | 1.95 |
| C | 2300 | 82.4 | 1.01 |
| D | 870 | 83.8 | 1.02 |
| E | 1800 | 95.0 | 0.56 |
| F | 750 | 78.1 | 0.50 |
| G | 2500 | 87.3 | 0.50 |

PREPARATION EXAMPLES 8 TO 9

Polymer H was prepared in the same manner as in Preparation Example 1, except for using 384 g of vinyl acetate and 16 g of acrylic acid as monomers (monomer concentration: 80%).

Polymer I was prepared in the same manner as for polymer H, except for decreasing the monomer concentration to 60% and decreasing the amount of the alkali as a saponifier.

Physical properties of polymers H and I are shown in Table 2 below. For reference, physical properties of commercially available PVA (hereinafter simply referred to as PVA) are also shown in Table 2.

TABLE 2

| Polymer No. | Degree of Polymerization | Degree of Saponification (%) | Carboxyl Group Content (meq/g) |
|---|---|---|---|
| H | 1200 | 98.4 | 0.89 |
| I | 720 | 89.1 | 0.87 |
| PVA | 760 | 85.5 | 0.03 |

EXAMPLES 1 TO 12 AND COMPARATIVE EXAMPLES 1 TO 2

30 g of a powder of polymer A was dissolved in 270 g of deionized water while heating to prepare a 10% solution. After adjusting the pH to 2.8 with a small amount of diluted hydrochloric acid, the solution was transferred to a 500 ml-separable flask. To the solution were added 22.0 g of glycidyl methacrylate (hereinafter abbreviated as GMA) (corresponding to 5 molar times the carboxyl group in polymer A) and 0.1 g of hydroquinone monomethyl ether (hereinafter abbreviated as MQ), and the mixture was heated to 70° C., followed by stirring for 3 hours. After allowing the reaction mixture to cool, it was poured into a large quantity of methanol, and the precipitated polymer was purified and dried in a usual manner.

The resulting purified product was subjected to alkalimetry to obtain the content of the unreacted carboxyl group, and the difference from polymer A in carboxyl group content was taken as the amount of the introduced vinyl group. Further, a part of the product was dissolved in water to prepare a 20% aqueous solution. 0.2 ml of a 25% ammonium persulfate and 0.2 ml of a 80% triethanolamine aqueous solution were added to a 1 ml aliquot of the solution, and the mixture was shaken in a test tube to conduct gelation test. As a result, the mixture was gelled within 1 minute.

In the following gel tests, a sample which underwent gelation within 5 minutes was rated "good", and a sample which underwent no gelation within 5 minutes was rated "bad".

Each of polymers shown in Tables 1 and 2 was subjected to the same procedures as described above, except for altering the amount of GMA, the reaction temperature, and the reaction time.

For comparison, each of polymer A and the commercially available PVA shown in Table 2 was subjected to the same procedures as described above, except that the pH of the aqueous solution of polymer A was not adjusted.

The reaction conditions and the results of these measurements are shown in Table 3 below.

EXAMPLES 13 TO 18 AND COMPARATIVE EXAMPLE 3

In a 500 ml-separable flask equipped with a reflux condenser, a stirrer, and a thermometer, 240 g of a 25% methanol aqueous solution and 60 g of a powder of polymer A were changed, and the mixture was heated to 50° C. with stirring to prepare a polymer solution. Diluted hydrochloric acid was added to the solution in an amount corresponding to 0.8 times the number of moles of the carboxyl group in polymer A. The cover of the flask was temporarily opened, and a glass electrode was put therein to measure the pH of the solution. The pH was 2.8. The flask was closed, and 44.0 g of GMA (corresponding to 5 times the number of moles of the carboxyl group in polymer A) and 0.1 g of MQ were added, the temperature was raised to 70° C., and the mixture was stirred at reflux for 3 hours. Immediately after the reaction, a part of the reaction mixture was withdrawn and subjected to gelation test in the same manner as in Example 1. The sample was gelled within 1 minute. Further, another part of the reaction mixture was purified by another precipitation in methanol and subjected to alkalimetry to determine the vinyl group introduced.

In the same manner as described above, each of polymers D, F, G, and H and the commercially available PVA was tested while varying the composition of the mixed solvent and the reaction conditions.

The reaction conditions and the results obtained are shown in Table 4 below.

TABLE 3

| | Reaction Conditions | | | | Polymer Produced | |
| | | | | | Introduced | |
| Polymer No. | GMA/COOH Molar Ratio | pH | Temp. (°C.) | Time (hr) | Vinyl Group (meq/g) | Gelation Test |
| --- | --- | --- | --- | --- | --- | --- |
| Example No. | | | | | | |
| 1 | A | 5 | 2.8 | 70 | 3 | 0.31 | Good |
| 2 | A | 5 | 3.2 | 70 | 3 | 0.28 | Good |
| 3 | A | 3 | 2.8 | 70 | 3 | 0.26 | Good |
| 4 | B | 5 | 2.8 | 70 | 3 | 0.38 | Good |
| 5 | B | 3 | 2.9 | 80 | 1 | 0.35 | Good |
| 6 | C | 5 | 2.5 | 80 | 1 | 0.32 | Good |
| 7 | D | 5 | 2.8 | 80 | 1 | 0.29 | Good |
| 8 | E | 5 | 2.7 | 70 | 3 | 0.084 | Good |
| 9 | F | 5 | 2.7 | 70 | 3 | 0.079 | Good |
| 10 | G | 5 | 2.7 | 70 | 3 | 0.068 | Good |
| 11 | H | 5 | 2.6 | 70 | 3 | 0.18 | Good |
| 12 | I | 5 | 2.8 | 70 | 3 | 0.16 | Good |
| Compara. Example | | | | | | |
| 1 | A | 5 | 7.3 | 70 | 3 | 0.01 | Bad |
| 2 | PVA | 5 | 3.0 | 70 | 3 | 0.00 | Bad |

Note: Polymer concentration: 10%

TABLE 4

| | | Reaction Conditions | | | | | Polymer Produced | |
| Example No. | Polymer No. | Polymer Concentration (wt %) | Solvent Composition | pH | Temp. (°C.) | Time (hr) | Introduced Vinyl Group (meq/g) | Gelation Test |
| --- | --- | --- | --- | --- | --- | --- | --- | --- |
| 13 | A | 20 | 25% methanol | 2.8 | 70 | 3 | 0.32 | Good |
| 14 | D | 20 | 25% methanol | 3.0 | 70 | 3 | 0.080 | Good |
| 15 | D | 40 | 50% ethanol | 2.5 | 80 | 1 | 0.081 | Good |
| 16 | F | 40 | 50% ethanol | 2.8 | 80 | 0.5 | 0.079 | Good |
| 17 | G | 40 | 62% methanol | 2.6 | 80 | 0.5 | 0.068 | Good |
| 18 | H | 40 | 62% methanol | 2.5 | 80 | 0.5 | 0.20 | Good |
| Compara. | PVA | 40 | 50% ethanol | 7.5 | 80 | 0.5 | 0.00 | Bad |

TABLE 4-continued

| | | Reaction Conditions | | | | | Polymer Produced | |
|---|---|---|---|---|---|---|---|---|
| Example No. | Polymer No. | Polymer Concentration (wt %) | Solvent Composition | pH | Temp. (°C.) | Time (hr) | Introduced Vinyl Group (meq/g) | Gelation Test |
| Example 3 | | | | | | | | |

Note: GMA/COOH molar ratio: 5

EXAMPLE 19 AND COMPARATIVE EXAMPLE 4

Each of the purified polymers of Examples 1 and 16 was dissolved in water, and a photo-initiator was added thereto to prepare a photo-curing coating composition. The composition was coated on a substrate and dried, and photo-curing characteristics of the film were evaluated as follows. Curing experiments were also conducted for photo-curing compositions which further contained a water-soluble monomer.

A solution comprising the components shown in Table 5 below in the respective concentrations was prepared. The solution was coated on a glass plate (GL) or a surface-grained aluminum plate (AL) by using a spinner and dried at 60° C. for 10 minutes. The dried film was stepwise exposed to light emitted from a 500 W high-pressure mercury lamp vertically set above the film at a distance of 15 cm and then developed with deionized water. The time of exposure required for the irradiated area (pattern) to start curing and that required to complete curing (the end or curing where no further change was induced by exposure) of the pattern was recorded.

Abbreviations in Table 5 have the following meanings:

| Water-Soluble Monomer: | |
|---|---|
| HEMA | Hydroxyethyl methacrylate |
| HEA | Hydroxyethyl acrylate |
| AOH | Allyl alcohol |
| AA | Acrylic acid |
| Photo-Initiator: | |
| BK | Benzyl dimethyl ketal |
| PK | 4-(2-Hydroxyethoxy)phenyl (2-hydroxy-2-propyl) ketone ("Darocur 2959" produced by E. Merck) |

For comparison, the same experiments were carried out on the polymers of Comparative Examples 2 and 3.

The results obtained are shown in Table 5. The pattern obtained by using the polymer of the, present invention was cured in several seconds to provide a transparent film having satisfactory adhesion, whereas a cured film was not obtained in using the polymer of Comparative Example 2 or 3.

TABLE 5

| Example No. | Polymer Used (%) | | Monomer (%) | | Photo-Initiator (%) | Substrate | Rate of Curing Start (sec) | End (sec) |
|---|---|---|---|---|---|---|---|---|
| 19-1 | Example 1 | 7.3 | — | | BK 0.1 | GL | 2 | 4 |
| 19-2 | Example 1 | 7.3 | — | | PK 0.9 | GL | 1 | 2 |
| 19-3 | Example 1 | 7.3 | — | | PK 0.9 | AL | 0.2 | 1 |
| 19-4 | Example 1 | 7.1 | HEMA | 2.2 | PK 0.9 | GL | 0.5 | 2 |
| 19-5 | Example 1 | 7.1 | HEMA | 2.2 | PK 0.9 | AL | 0.2 | 1 |
| 19-6 | Example 1 | 7.1 | HEA | 2.2 | PK 0.8 | GL | 0.5 | 2 |
| 19-7 | Example 1 | 6.7 | AOH | 8.3 | PK 0.8 | GL | 1 | 3 |
| 19-8 | Example 1 | 6.7 | AA | 8.3 | PK 0.8 | GL | 0.5 | 1 |
| 19-9 | Example 16 | 7.3 | — | | BK 0.1 | GL | 3 | 5 |
| 19-10 | Example 16 | 7.3 | — | | PK 0.9 | GL | 0.5 | 3 |
| 19-11 | Example 16 | 7.3 | HEMA | 2.9 | PK 0.9 | GL | 0.5 | 1 |
| 19-12 | Example 16 | 7.1 | HEMA | 2.9 | PK 0.9 | AL | 0.2 | 1 |
| 19-13 | Example 16 | 7.1 | HEA | 2.9 | PK 0.9 | GL | 1 | 3 |
| 19-14 | Example 16 | 6.7 | AOH | 8.3 | PK 0.8 | GL | 2 | 4 |
| 19-15 | Example 16 | 6.7 | AA | 8.3 | PK 0.8 | GL | 0.5 | 4 |
| Compara. Ex. 4-1 | Comparative Example 2 | 7.1 | HEMA | 2.2 | PK 0.9 | GL | no curing | |
| Compara. Ex. 4-2 | Comparative Example 3 | 7.1 | HEMA | 2.2 | PK 0.9 | GL | no curing | |

While the invention has been described in detail and with reference to specific examples thereof, it will be apparent to one skilled in the art that various changes and modifications can be made therein without departing from the spirit and scope thereof.

We claim:

1. A water-soluble radical-curing polyvinyl alcohol derivative which is obtained by reacting an anion-modified polyvinyl alcohol prepared by saponification of a copolymer comprising vinyl acetate and at least one of an unsaturated carboxylic acid and a derivative thereof with a glycidyl-containing vinyl compound in water or in a mixed solvent of water and a lower alcohol having from 1 to 4 carbon atoms under acidic conditions.

2. The water-soluble radical-curing polyvinyl alcohol derivative as claimed in claim 1, wherein the degree of saponification of the anion-modified polyvinyl alcohol is at least 60%.

3. The water-soluble radical-curing polyvinyl alcohol derivative as claimed in claim 2, wherein the degree of saponification of the anion-modified polyvinyl alcohol is from 75 to 90%.

4. The water-soluble radical-curing polyvinyl alcohol derivative as claimed in claim 2, wherein the degree of saponification of the anion-modified polyvinyl alcohol is substantially 100%.

5. The water-soluble radical-curing polyvinyl alcohol derivative as claimed in claim 1, wherein said anion-modified polyvinyl alcohol contains from 0.5 to 10 mol% of at least one of said unsaturated carboxylic acid and a derivative thereof.

6. The water-soluble radical-curing polyvinyl alcohol derivative as claimed in claim 1, wherein said anion-modified polyvinyl alcohol has a polyethylene oxide-reduced degree of polymerization of from about 500 to 3800 as measured by gel-permeation chromatography.

7. The water-soluble radical-curing polyvinyl alcohol derivative as claimed in claim 1, wherein said glycidyl-containing vinyl compound is glycidyl acrylate or glycidyl methacrylate.

8. The water-soluble radical-curing polyvinyl alcohol derivative as claimed in claim 1, wherein said unsaturated carboxylic acid is selected from the group consisting of acrylic acid, methacrylic acid, maleic acid, fumaric acid, and itaconic acid.

9. The water-soluble radical-curing polyvinyl alcohol derivative as claimed in claim 1, wherein said derivative of the unsaturated carboxylic acid is capable of forming a free carboxyl group or salt thereof on saponification subsequent to copolymerization.

10. The water-soluble radical-curing polyvinyl alcohol derivative as claimed in claim 9, wherein said derivative of the unsaturated carboxylic acid is selected from the group consisting of esters, anhydrides and salts of the unsaturated carboxylic acid.

11. The water-soluble radical-curing polyvinyl alcohol derivative as claimed in claim 1, wherein said copolymer further comprises a third vinyl monomer other than vinyl acetate and the unsaturated carboxylic acid or a derivative thereof.

12. The water-soluble radical-curing polyvinyl alcohol derivative as claimed in claim 4, wherein said degree of polymerization of the anion-modified polyvinyl alcohol is from about 700 to 1000.

13. The water-soluble radical-curing polyvinyl alcohol derivative as claimed in claim 1, wherein said glycidyl-containing vinyl compound is used from 2 to 5 molar times the carboxyl group in the anion-modified polyvinyl alcohol.

14. The water-soluble radical-curing polyvinyl alcohol derivative as claimed in claim 1, wherein the lower alcohol is selected from the group consisting of methanol and ethanol.

15. The water-soluble radical-curing polyvinyl alcohol derivative as claimed in claim 1, wherein the reaction between said anion-modified polyvinyl alcohol and said glycidyl-containing vinyl compound is conducted at a pH ranging from 1 to 5.

16. The water-soluble radical-curing polyvinyl alcohol derivative as claimed in claim 1, wherein the reaction takes place under heating conditions with stirring.

17. The water-soluble radical-curing polyvinyl alcohol derivative as claimed in claim 1, wherein the reaction temperature is in the range from about 50° C. to 80° C.

18. The water-soluble radical-curing polyvinyl alcohol derivative as claimed in claim 10, wherein the carboxylic acid is selected from the group consisting of acrylic acid, methacrylic acid, maleic acid, fumaric acid, and itaconic acid.

* * * * *